(12) United States Patent
Kozai et al.

(10) Patent No.: US 7,136,718 B2
(45) Date of Patent: Nov. 14, 2006

(54) NUMERICAL CONTROL APPARATUS

(75) Inventors: Haruhiko Kozai, Yamanashi (JP); Takahiko Endo, Kokubunji (JP); Eiji Genma, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/218,502

(22) Filed: Sep. 6, 2005

(65) Prior Publication Data

US 2006/0052900 A1  Mar. 9, 2006

(30) Foreign Application Priority Data

Sep. 6, 2004 (JP) ............................. 2004-258452

(51) Int. Cl.
*G06F 19/00* (2006.01)
(52) U.S. Cl. ....................... 700/159; 700/170
(58) Field of Classification Search ................ 700/159, 700/169, 170, 173
See application file for complete search history.

(56) References Cited

U.S. PATENT DOCUMENTS

| | | | |
|---|---|---|---|
| 4,078,195 A * | 3/1978 | Mathias et al. ............. | 318/561 |
| 4,092,720 A | 5/1978 | Carey ........................ | 700/181 |
| 4,346,444 A | 8/1982 | Schneider et al. .......... | 700/173 |
| 5,010,285 A | 4/1991 | Kawamura et al. ......... | 318/569 |
| 5,291,416 A * | 3/1994 | Hutchins .................... | 700/174 |
| 5,528,506 A | 6/1996 | Yoshida et al. ............. | 700/188 |

FOREIGN PATENT DOCUMENTS

| EP | 0 530 032 | 3/1993 |
|---|---|---|
| WO | 01/73670 | 10/2001 |

OTHER PUBLICATIONS

EP Search Report for corresponding application 05255363.3-2206 dated Jan. 3, 2006.

* cited by examiner

*Primary Examiner*—Leo Picard
*Assistant Examiner*—Chad Rapp
(74) *Attorney, Agent, or Firm*—Staas & Halsey LLP

(57) ABSTRACT

When a read block includes a code for setting a machine coordinate system used for exchanging a tool or the like, it is determined whether a feed rate specifying modes, set by a parameter, is (a) specification by using parameters, (b) specification by a program, or (c) specification by using an external signal input. In mode (a), the rapid traverse speed set for movement according to machine coordinate system or different feed rate set by a parameter is selected and set as feed rate F. In mode (b), a feed rate specified by a program is set as feed rate F. In mode (c), an input signal is converted into a speed which is set as feed rate F. Then the movement command according to the machine coordinate system is executed with this set feed rate F.

5 Claims, 3 Drawing Sheets

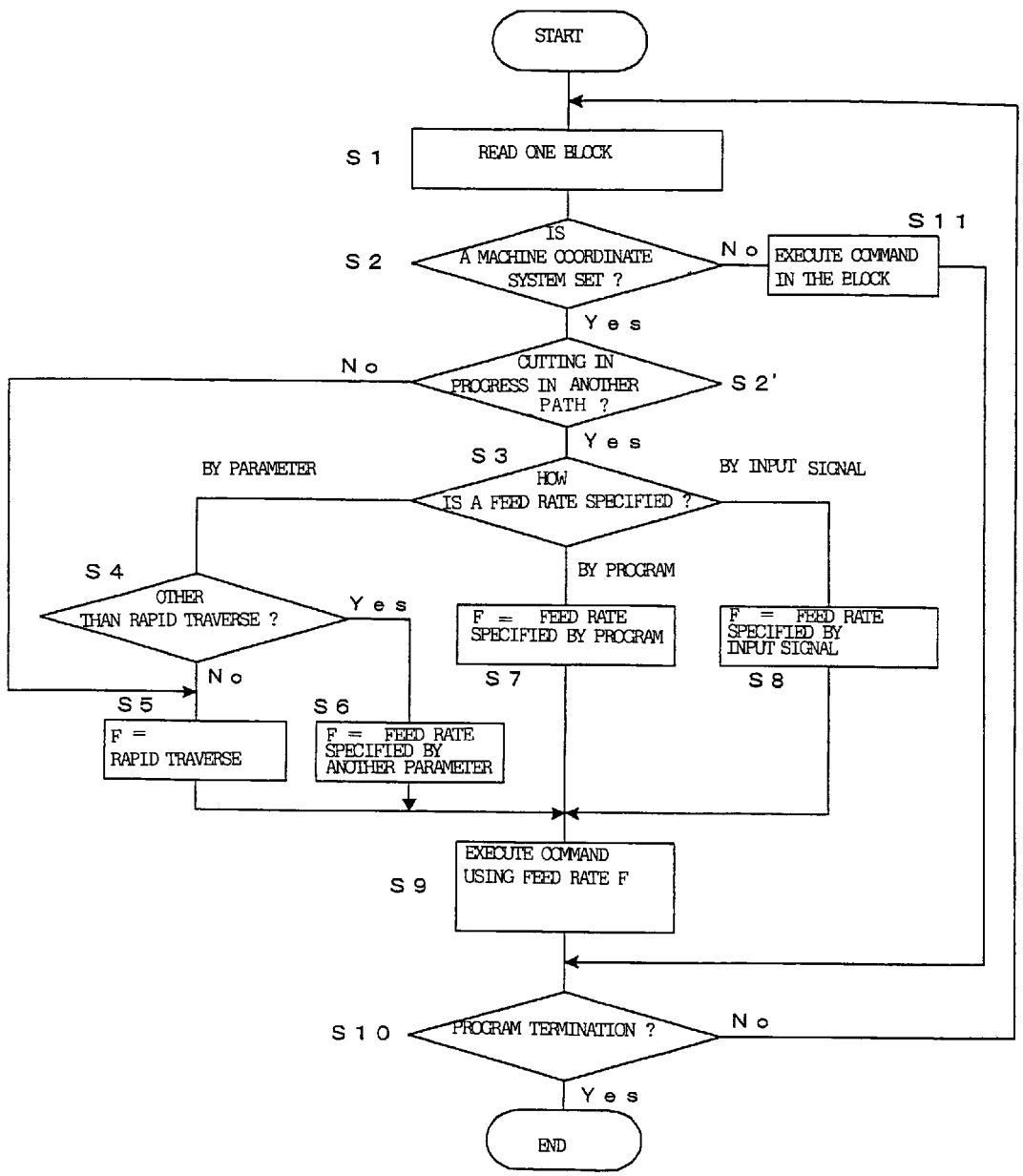

NUMERICAL CONTROL APPARATUS

BACKGROUND OF THE INVENTION

1. Field of the Invention

The present invention relates to a numerical control apparatus that has function to perform motion control according to a machine coordinate system.

2. Description of the Related Art

In numerical control apparatuses for controlling machines such as machine tools, motion control is carried out on the basis of positions in a machine coordinate system which is set in advance for a machine when positioning a workpiece as an object to be machined or otherwise worked at a fixed position or positioning a moving part of a machine at a fixed position for tool exchange. A machine coordinate system is set for a machine and is fixed with respect to the installation position of the machine.

On the other hand, when machining or otherwise working a workpiece, a coordinate system is set for the workpiece, and machining or the like is carried out on the basis of positions in the workpiece coordinate system. Machining programs for machining a workpiece is usually created on the basis of such a workpiece coordinate system and machining is carried out in accordance with positions in the workpiece coordinate system.

Feeding of a moving axis according to a workpiece coordinate system is carried out at a feed rate specified by a machining program or the like, but a feed rate in positioning on the basis of a machine coordinate system is a rapid traverse speed which is set by parameters and a fixed value.

In case of a movement command according to a machine coordinate system, a moving part of a machine is driven at a rapid traverse speed set in advance, resulting in a high-speed axis movement. However, a high-speed movement may not be suitable for some workpieces or some peripheral environment of a machine. Interference due to an overshoot may occur when a moving axis is being stopped, a machine may suffer vibrations due to high speed movement so that this vibration may adversely affect the machine and its peripheral devices. This situation is particularly problematic for machine tools that operate under multi-path system control. When cutting is in progress in one path while a movement command is issued on the basis of a machine coordinate system in other path, for example, a tool exchange command is issued and positioning is carried out on the basis of a machine coordinate system, in the other path, a high-speed axial movement will be carried out under a set rapid traverse speed up to a tool exchange position in the above "the other path". This high-speed axial movement will cause vibration on the machine, and this vibration will adversely affect the ongoing cutting process in the above "one path", thereby lowering the machining precision on the machined surface.

SUMMARY OF THE INVENTION

A numerical control apparatus according to a first aspect of the invention has a function to drive a moving axis at a preset feed rate by means of moving axis drive means in accordance with movement commands according to a machine coordinate system. The numerical control apparatus also comprises feed rate changing means for altering the preset feed rate of the moving axis to a different feed rate, and the moving axis driving means drives the moving axis at the altered feed rate.

A numerical control apparatus according to a second aspect of the invention has a plurality of control paths and function to drive a moving axis at a preset feed rate by means of moving axis drive means in accordance with movement commands according to a machine coordinate system. The numerical control apparatus comprises:

means for determining whether, when a movement command according to a machine coordinate system is issued for any one of the plurality of control paths, machining is in progress in the other control path or not; and feed rate changing means for altering the preset feed rate of the moving axis to a different feed rate when determined that machining is in progress in the other control path. And the moving axis driving means drives the moving axis at the altered feed rate.

The feed rate changing means may alter the preset feed rate by a program, by using an external input signal or by using an external input signal, to specify the different feed rate.

According to the numerical control apparatus of the present invention, in case where a moving axis is moved by a movement command according to a machine coordinate system when changing a tool, the speed of the moving axis can be changed from a conventional rapid traverse speed to any specified feed rate, so that it is possible to suppress an overshoot which will occur during movement according to the machine coordinate system and vibration caused by high-speed movement.

In control of a machine tool using a multi-path system control, even when cutting is in progress in one path while a moving axis is moved on the basis of a machine coordinate system in the other path, cutting precision will not be lowered.

BRIEF DESCRIPTION OF THE DRAWINGS

The forgoing and other objects and feature of the invention will be apparent from the following description of preferred embodiments of the invention with reference to the accompanying drawings, in which:

FIG. 3 is a flowchart illustrating the process of changing and setting of a feed rate by using the numerical control apparatus shown in FIG. 1, wherein only when one path in a machine tool using a multi-path system control is carrying out cutting, the feed rate in a movement command of the other path in the machine tool on the basis of a machine coordinate system can be changed to any specified feed rate.

DETAILED DESCRIPTION OF THE PREFERRED EMBODIMENTS

An exemplary numerical control apparatus that performs multi-path system control will be described below as an embodiment of the present invention.

Figure 1:
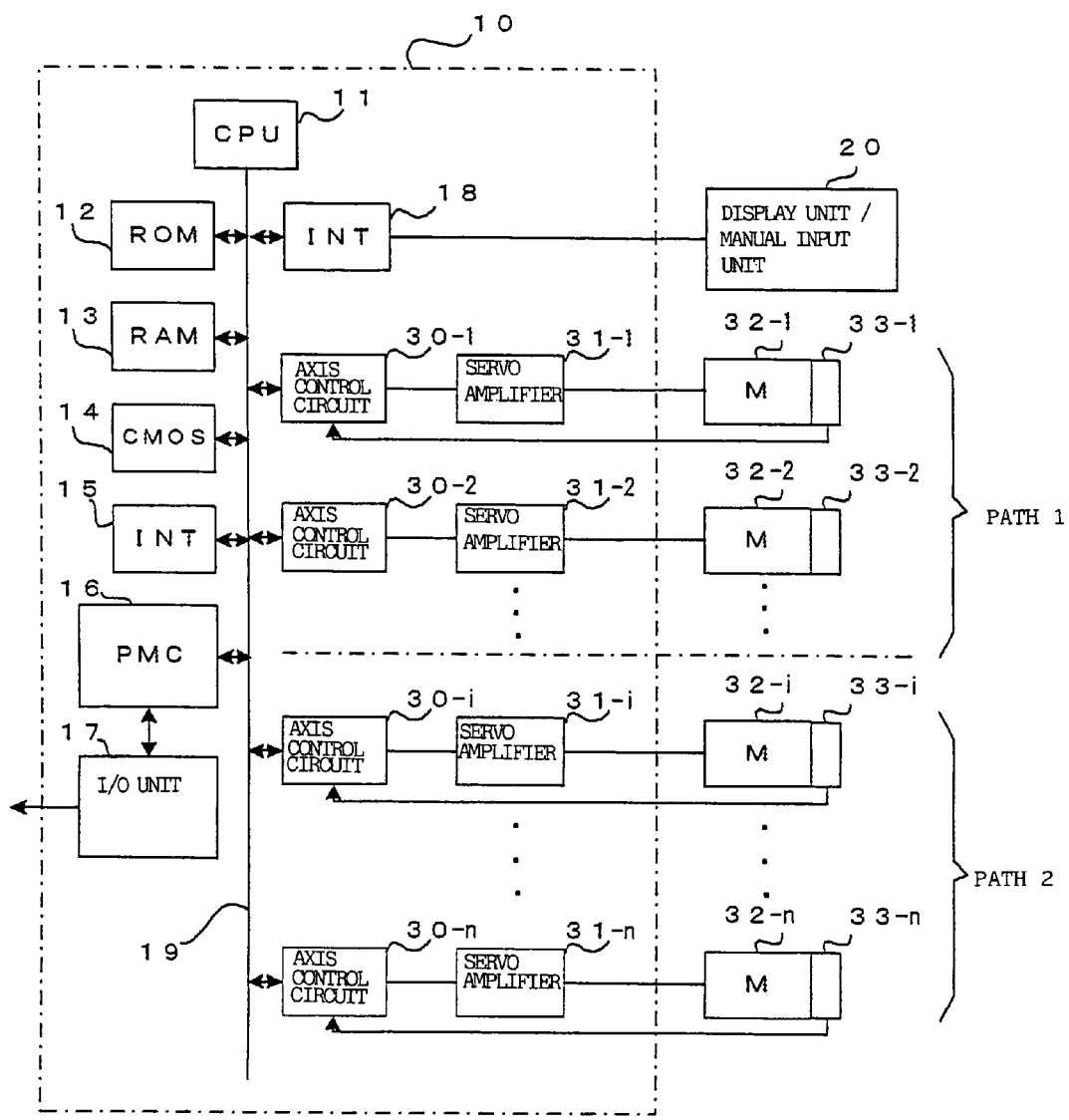
FIG. 1 is a block diagram illustrating the main elements of a numerical control apparatus according to the present invention.

FIG. 1 is a block diagram indicating the main elements of the numerical control apparatus 10 that embodies the present invention. The CPU 11 is a processor that controls the numerical control apparatus 10 overall. A ROM 12, a RAM 13, a CMOS memory 14, interfaces 15 and 18, a programmable machine controller (PMC) 16, and axis control circuits 30-1 to 30-n are connected to the CPU 11 via a bus 19.

The CPU 11 reads out a system program stored in the ROM 12 via the bus 19, and controls the entire numerical control apparatus according to the system program. The RAM 13 stores temporary computation data and display data, and also stores various data items inputted by an operator from a display unit/manual input unit 20. The display unit/manual input unit 20, which is connected to the bus 19 through the interface 18, comprises a display unit including a CRT or liquid crystal display and manual input means including a keyboard or the like.

The CMOS memory 14 is backed up by a battery (not shown) and configured as a non-volatile memory that retains stored data even when the numerical control apparatus 10 is powered off. The CMOS memory 14 stores machining programs read in through the interface 15 and other machining programs inputted from the display unit/manual input unit 20.

The interface 15 enables the numerical control apparatus 10 to be connected to an external device. The PMC 16 outputs signals according to a sequence program contained in the numerical control apparatus 10 through the I/O unit 17 to an auxiliary device of the machine tool to be controlled. The PMC 16 also receives signals from switches on an operation panel disposed on the body of the machine tool to be controlled by the numerical control apparatus 10, performs necessary signal processing, and passes the signals to the CPU 11.

Servo amplifiers 31-1 to 31-n are connected to the axis control circuits 30-1 to 30-n, and the servo motors 32-1 to 32-n that drive the moving axes are connected to the servo amplifiers 31-1 to 31-n. Servo motors 32-1 to 32-n are equipped with position/speed detectors 33-1 to 33-n, the outputs from which are fed back to the corresponding axis control circuits 30-1 to 30-n.

Axis control circuits 30-1 to 30-n perform position feedback control and speed feedback control according to movement commands of individual axes issued from the CPU 11 and position feedback signals and speed feedback signals fed from the position/speed, and further performs current loop control, thereby controlling the driving of servo motors 32-1 to 32-n through servo amplifiers 31-1 to 31-n.

The numerical control apparatus 10 can control a plurality of paths. The numerical control apparatus according to the embodiment shown in FIG. 1 can control two paths; servo motors 32-1 to 32-(i-1) drive the moving axes in control path 1, and servo motors 32-i to 32-n drive the moving axes in control path 2.

Figure 2:
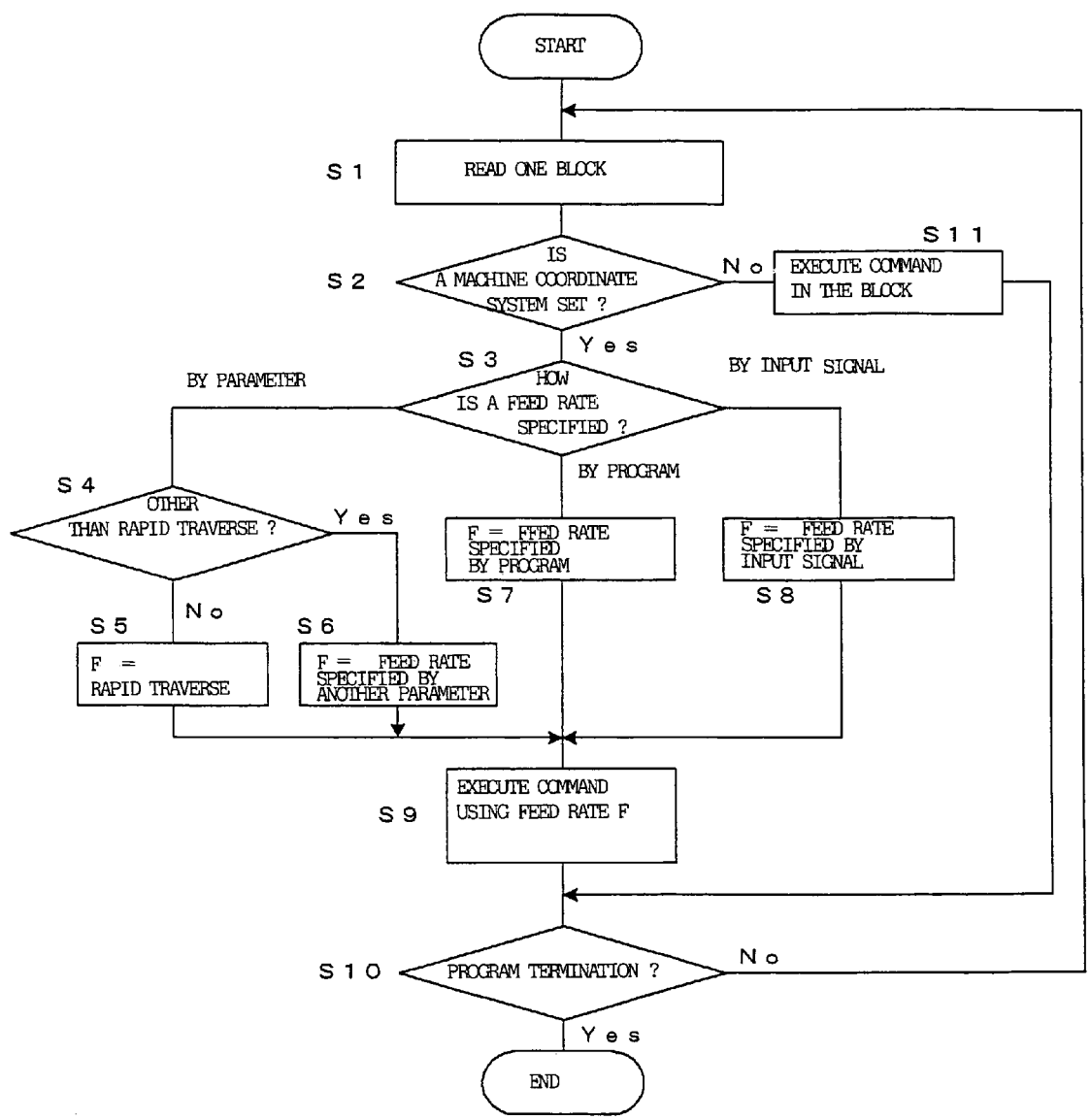
FIG. 2 is a flowchart illustrating the process of changing and setting of a feed rate according to a machine coordinate system by using the numerical control apparatus shown in FIG. 1.

FIG. 2 is a flowchart illustrating the process of changing and setting of a feed rate in a movement command according to a machine coordinate system, according to the embodiment. The CPU 11 in the numerical control apparatus executes machining programs for each path. The process of changing and setting of a feed rate in a movement command according to a machine coordinate system, as shown in FIG. 2, is also executed for each path. In this embodiment, the feed rate in a movement command according to a machine coordinate system can be changed by one of the following three specification modes: (a) specification by using a parameter; (b) specification by a program; and (c) specification by using an external input signal. Any one of these specification modes can be selected by means of a parameter.

To simplify the description that follows, a parameter A is used for selecting any one of the above three specification modes. When specifying a feed rate by using a parameter (mode (a)), a parameter B is used for selecting either (a-1) the rapid traverse speed set for movement according to a machine coordinate system, or (a-2) a feed rate set by another parameter, such as parameter C.

First, one block is read from the machining program (step S1), and it is determined whether or not a G code (preparation function) for setting a machine coordinate system is included in the read block. If there is no G code for setting a machine coordinate system in the read block, the commands in the block are executed by the conventional procedure (step S11). If the read block does not command termination of the program (step S10), the sequence returns to step S1 to read the next block.

If the command block read in step S1 includes a G code for setting a machine coordinate system, on the other hand, it is determined which one of the modes for specifying a feed rate in movement according to a machine coordinate system, which have been set by parameter A, is selected (step S3).

If the mode of specifying a feed rate by a parameter is selected, then parameter B is checked to determine whether a rapid traverse speed set for movement according to a machine coordinate system is to be selected or another feed rate is to be selected (step S4).

If a rapid traverse speed set for movement according to a machine coordinate system is selected, this selected rapid traverse speed is set as feed rate F (step S5). If a feed rate different from the rapid traverse speed set for movement according to a machine coordinate system is selected, on the other hand, then the above feed rate set by parameter C, different from the rapid traverse speed, is set as feed rate F (step S6).

If it is determined in step S3 that the setting in parameter A is specification of feed rate by a program, then the feed rate specified in the block by an F code together with G code for setting a machine coordinate system is set as feed rate F (step S7). In this case, the feed rate is specified, for example, by a format of "G53 X_Y_Z_F_;", where "$_G$53" is a G code for setting a machine coordinate system. If it is determined in step S3 that the setting in parameter A is specification of feed rate by using an input signal, on the other hand, an external signal for specifying a speed to be inputted through the PMC 16 is converted into a feed rate, and the converted feed rate is set as feed rate F (step S8).

The processing of the current block is carried out with the feed rate F which has been set in such a manner as described above (step S9). Specifically, the moving axis is driven and moved at the set feed rate F. Then it is determined whether the current block commands termination of the program or not (step S10). If the current block does not command termination of the program, the sequence returns to step S1 to read the next block. The processing described above continues to be executed until a program termination command is read.

When a machine coordinate system is set by the processing described above, and movement according to a machine coordinate system is carried out, for example, a tool exchange is performed, the machine coordinate system is selected by a G code for setting a machine coordinate system and tool exchange command is issued. Therefore, when exchanging a tool, any feed rate other than the rapid traverse speed set for movement according to a machine coordinate system can be specified by a parameter setting, using a program, or inputting a signal.

The feed rate setting changing process for movement according to a machine coordinate system, shown in FIG. 2, can be applied both to a numerical control apparatus that controls a plurality of paths as shown in FIG. 1, and to a numerical control apparatus that controls only one path. Since a feed rate of a movement command according to a machine coordinate system can be set to any value, it is possible to specify a lower feed rate in case where the high speed movement under the rapid traverse speed set for movement according to a machine coordinate system would cause vibration and interference due to an overshoot.

Particularly, when the numerical control apparatus shown in FIG. 1 controls a machine tool by multi-path system control, if cutting is in progress in one path while a moving part is fed in another path for tool exchange, for example, on the basis of a machine coordinate system, the rapid traverse speed set for movement according to machine coordinate system would cause vibration, thereby adversely affecting the cutting and lowering the machining precision. However, by lowering a feed rate in a movement command according to a machine coordinate system, vibration of the machine can be suppressed and the cutting precision can be improved. In addition, only when cutting is in progress in the other path, machining precision can be maintained by changing the feed rate in the movement command according to a machine coordinate system to any speed lower than the rapid traverse speed set for movement according to machine coordinate system.

FIG. 3 is a flowchart illustrating processing for changing, when cutting is in progress in the other path, the feed rate in the movement command according to a machine coordinate system to any speed lower than the rapid traverse speed set for movement according to machine coordinate system. The processing in FIG. 3 is the same as the processing in FIG. 2, except that step S2' is added between step S2 and step S3 in the case of FIG. 3.

Specifically, if a G code (preparation function) for setting a machine coordinate system is included in the block that has been read (step S2), it is determined whether or not cutting is in progress in the other path (step S2'). If cutting is not in progress in the other path, the sequence proceeds to step S5, in which the feed rate is set to the rapid traverse speed set for movement according to machine coordinate system, and the command in the read block is executed with the set feed rate (step S9).

If cutting is in progress in the other path, on the other hand, the sequence proceeds to step S3, and further processing is executed according to the specification mode of the feed rate setting. The processing in step S3 and thereafter is the same as in FIG. 2.

In the processing in FIG. 3, even when movement according to a machine coordinate system is made for tool exchange or the like while cutting is in progress in the other path, in a machine tool operating under multi-path system control, the moving part is fed at a specified (lower) feed rate other than the rapid traverse speed set for movement according to machine coordinate system, with the result that vibration and other problems can be suppressed, thus maintaining high cutting precision.

In the embodiment described above, selective specification of a feed rate is carried out by using parameters for positioning a moving axis according to a machine coordinate system, but this specification may be carried out using a code for setting a machine coordinate system. In this case, different codes for setting a machine coordinate system may be used; for example, "G53" for specifying a feed rate by using parameters, "G53-1" for specifying a feed rate by a program, and "G53-2" for specifying a feed rate by using an external input signal.

In the embodiment described above, the processing in steps S3 to S8 constitutes feed rate changing means, in which any one of a plurality of specification modes prepared for changing a feed rate is selected. However, feed rate changing means may be arranged by any one of specifications including specification by a parameter, specification by a program, and specification by using an external signal.

The invention claimed is:

1. A numerical control apparatus, comprising:
    moving axis drive means for driving a moving axis at a preset feed rate in accordance with movement commands according to a machine coordinate system; and
    feed rate changing means for altering the preset feed rate of the moving axis to a different feed rate using a first parameter for selecting one of a plurality of specification modes to specify the different feed rate;
    wherein the moving axis driving means drives the moving axis at the altered feed rate.

2. A numerical control apparatus having a plurality of control paths, comprising:
    moving axis drive means for driving a moving axis at a preset feed rate in accordance with movement commands according to a machine coordinate system;
    means for determining whether, when a movement command according to the machine coordinate system is issued for any one of the plurality of control paths, machining is in progress in the other control path or not; and
    feed rate changing means for altering the preset feed rate of the moving axis to a different feed rate when it is determined that machining is in progress in the other control paths;
    wherein the moving axis driving means drives the moving axis at the altered feed rate.

3. The numerical control apparatus according to claim 1 or 2, wherein the feed rate changing means alters the preset feed rate by using a second parameter to specify the different feed rate.

4. The numerical control apparatus according to claim 1 or 2, wherein the feed rate changing means alters the preset feed rate by a program to specify the different feed rate.

5. The numerical control apparatus according to claim 1 or 2, wherein the feed rate changing means alters the preset feed rate by using an external input signal to specify the different feed rate.

* * * * *